(12) United States Patent
Joseph et al.

(10) Patent No.: US 8,836,755 B2
(45) Date of Patent: Sep. 16, 2014

(54) TWO DIMENSIONAL MEDIA COMBINER FOR CREATING THREE DIMENSIONAL DISPLAYS

(75) Inventors: Daniel M. Joseph, Los Angeles, CA (US); Mark A. Reichow, Valencia, CA (US)

(73) Assignee: Disney Enterprises, Inc., Burbank, CA (US)

( * ) Notice: Subject to any disclaimer, the term of this patent is extended or adjusted under 35 U.S.C. 154(b) by 739 days.

(21) Appl. No.: 12/897,369

(22) Filed: Oct. 4, 2010

(65) Prior Publication Data

US 2012/0081524 A1    Apr. 5, 2012

(51) Int. Cl.
*H04N 13/00*   (2006.01)
*H04N 13/02*   (2006.01)
*H04N 13/04*   (2006.01)

(52) U.S. Cl.
CPC ....... *H04N 13/0443* (2013.01); *H04N 13/0239* (2013.01)
USPC ............................................................ 348/42

(58) Field of Classification Search
CPC ................................................. H04N 13/0239
USPC ............................................................ 348/42
See application file for complete search history.

(56) References Cited

U.S. PATENT DOCUMENTS

2009/0153976 A1 *  6/2009  Dolgoff ....................... 359/630

* cited by examiner

*Primary Examiner* — Sath V Perungavoor
*Assistant Examiner* — James Pontius
(74) *Attorney, Agent, or Firm* — Marsh Fischmann & Breyfogle LLP; Kent A. Lembke

(57) ABSTRACT

A three-dimensional (3D) display device combining two-dimensional (2D) images from two image sources to create a 3D image. The 3D display device utilizes a beam combining film that includes a prismatic front surface and a planar back surface. The film transmits light striking its back surface at particular incidence angles. A first 2D image source provides a foreground image and a second 2D image source to provide a background image. First and second liquid crystal displays may be arranged with display surfaces proximate to top and bottom edges of the beam combining film and at angular offsets to emit light corresponding with a 2D image stream onto the back surface of the beam combining film at one of the film's incidence angles. The 2D image streams striking the back surface of the film are combined by the film and transmitted from the front surface as a single autostereoscopic video image.

18 Claims, 7 Drawing Sheets

TWO DIMENSIONAL MEDIA COMBINER FOR CREATING THREE DIMENSIONAL DISPLAYS

BACKGROUND

1. Field of the Description

The present description relates, in general, to the illusion of stereoscopic or three dimensional (3D) image generation and projection, and, more particularly, to systems and methods for producing 3D images without requiring viewers to wear 3D glasses or the like (i.e., autostereoscopic graphic displays providing a 3D display to viewers rather than using projected images requiring a viewing technology such as particular glasses to be properly viewed or other known 3D display technology).

2. Relevant Background

There is a growing trend toward using 3D projection techniques in theatres and in home entertainment systems including video games and computer-based displays. In many conventional 3D projection techniques, the right eye and the left eye images are delivered separately to display the same scene or images from separate perspectives so that a viewer sees a three dimensional composite, e.g., certain characters or objects appear nearer than the screen and other appear farther away than the screen. Stereoscopy, stereoscopic imaging, and 3D imaging are labels for any technique capable of creating the illusion of depth in an image. Often, the illusion of depth in a photograph, movie, or other two-dimensional image is created by presenting a slightly different image to each eye or the creation of parallax. In most animated 3D projection systems, depth perception in the brain is achieved by providing two different images to the viewer's eyes representing two perspectives of the same object with a minor deviation similar to the perspectives that both eyes naturally receive in binocular vision.

The images or image frames used to produce such a 3D output are often called stereoscopic images or a stereoscopic image stream because the 3D effect is due to stereoscopic perception by the viewer. A frame is a single image at a specific point in time, and motion or animation is achieved by showing many frames per second (fps) such as 24 to 30 fps. The frames may include images or content from a live action movie filmed with two cameras or a rendered animation that is imaged or filmed with two camera locations. Stereoscopic perception results from the presentation of two horizontally offset images or frames with one or more object slightly offset to the viewer's left and right eyes, e.g., a left eye image stream and a right eye image stream of the same object. The amount of offset between the elements of left and right eye images determines the depth at which the elements are perceived in the resulting stereo image. An object appears to protrude toward the observer and away from the neutral plane or screen when the position or coordinates of the left eye image are crossed with those of the right eye image (e.g., negative parallax). In contrast, an object appears to recede or be behind the screen when the position or coordinates of the left eye image and the right image are not crossed (e.g., a positive parallax results).

Many techniques have been devised and developed for projecting stereoscopic images to achieve a 3D effect. One technique is to provide left and right eye images for a single, offset two-dimensional image and displaying them alternately, e.g., using 3D switching or similar devices. A viewer is provided with liquid crystal shuttered spectacles to view the left and the right eye images. The shuttered spectacles are synchronized with the display signal to admit a corresponding image one eye at a time. More specifically, the shutter for the right eye is opened when the right eye image is displayed and the liquid crystal shutter for the left eye is opened when the left eye image is displayed. In this way, the observer's brain merges or fuses the left and right eye images to create the perception of depth.

Another technique for providing stereoscopic viewing is the use of anaglyphs. An anaglyph is an image generally consisting of two distinctly colored, and preferably, complementary colored, images. The theory of anaglyph is the same as the technique described above in which the observer is provided separate left and right eye images, and the horizontal offset in the images provides the illusion of depth. The observer views the anaglyph consisting of two images of the same object in two different colors, such as red and blue-green, and shifted horizontally. The observer wearing anaglyph spectacles views the images through lenses of matching colors. In this manner, the observer sees, for example, only the blue-green tinted image with the blue-green lens, and only the red tinted image with the red lens, thus providing separate images to each eye. The advantages of this implementation are that the cost of anaglyph spectacles is lower than that of liquid crystal shuttered spectacles and there is no need for providing an external signal to synchronize the anaglyph spectacles.

In other 3D projection systems, the viewer may be provided glasses with appropriate polarizing filters such that the alternating right-left eye images are seen with the appropriate eye based on the displayed stereoscopic images having appropriate polarization (two images are superimposed on a screen, such as a silver screen to preserve polarization, through orthogonal polarizing filters). Other devices have been produced in which the images are provided to the viewer concurrently with a right eye image stream provided to the right eye and a left eye image stream provided to the left eye. Still other devices produce an auto-stereoscopic display via stereoscopic conversion from an input color image and a disparity map, which typically is created based on offset right and left eye images. While these display or projection systems may differ, each typically requires a stereographic image as input in which a left eye image and a slightly offset right eye image of a single scene from offset cameras or differing perspectives are provided to create a presentation with the appearance of depth.

There is a continuous desire and need to provide new techniques that provide cost effective but eye-catching content with depth and dimension. For example, it is desirable to grab the attention of crowds in shopping malls, on busy streets, in amusement parks, and other crowded facilities such as airports and entertainment arenas. As discussed above, 3D imagery is one exciting way to appeal to viewers and hold their attention. However, the use of 3D imagery has, in the past, been limited by a number of issues. Typically, 3D projection is used only in low light environments and is not particularly effective in applications where there is a significant amount of ambient light such as an outdoor venue during the daytime (e.g., an amusement park or athletic stadium in the morning or afternoon where conventional 3D video image projection cannot compete with sunlight). Further, 3D projection technologies generally require the viewer to wear special viewing glasses, which is often inconvenient for many applications and can significantly add to costs. Hence, there remains a need for systems and methods for providing autostereoscopic or 3D displays in a cost effective manner, in the presence of higher ambient light levels, and without the need for special eye or head wear.

SUMMARY

The present description addresses the above problems by providing an autostereoscopic display system or 3D display device that combines two-dimensional (2D) images from two or more image sources/surfaces (such as liquid crystal displays (LCDs), rear projected screens, light emitting diode (LED) backlit monitors, electronic display devices, emissive display, or the like) to form a displayed 3D image. The 3D display devices each utilize a beam combining film that includes a prismatic front surface and a planar/smooth back surface, and the film may be designed to be transmissive of light striking the back surface within particular ranges of incidence angles (and from particular directions such as the top and bottom of the film).

One exemplary embodiment of the 3D display device uses a first 2D image source to provide a foreground or front plane image and a second 2D image source to provide a background or back plane image. For example, first and second LCDs may be arranged with their display surfaces proximate to the top and bottom edges of the beam combining film and at angular offsets (such as 30 to 60 degrees) to emit light corresponding with a 2D image stream onto the back, planar surface of the beam combining film at one of the film's transmissive incidence angles and at one of the film's reflective incidence angles. The two 2D image streams striking the back surface of the film are combined by the film and transmitted outward from the prismatic front surface (e.g., orthogonal to the front surface) as a single 3D image stream or autostereoscopic video image.

The two display surfaces are angularly offset from each other (e.g., 70 to 120 degrees with the display surfaces being perpendicular to each other in some cases). The surfaces are also spaced apart from each other and the film by a small distance (e.g., a few inches or more). The relative angular positions and offset distances affecting what plane the 2D images appear to be in the autostereoscopic video image to a viewer observing the 3D display device (e.g., looking at the prismatic front surface of the combining film). When viewing the imagery of the 3D image stream from in front of the beam combining film, the image from the first 2D image source is overlaid on top of the image from the second 2D image source.

In other words, the 2D images from the first source appear to be foreground images in a front plane along the Z axis/plane extending out from the film's front surface while the 2D images from the second source appear to be background images in a back plane spaced apart from the front plane (e.g., to be closer to the beam combining film's front surface). This effect creates depth in the Z plane from multiple components of offset imagery or 2D and static/motion imagery that is combined from disparate sources (e.g., an animated or interactive feature provided as a foreground image from the first 2D image source that is combined with a static or moving background image from the second 2D image source).

More particularly, a 3D display device or apparatus is provided for creating an autostereoscopic display. The device includes a two dimensional (2D) beam combining assembly and a 2D media source assembly. The 2D media source assembly operates to: (1) display a 2D foreground image toward the 2D beam combining assembly; and (2) concurrently display a 2D background image toward the 2D beam combining assembly. The 2D beam combining assembly is configured to transmit the 2D foreground image and the 2D background image in a combined three dimensional (3D) image with motion parallax. When the device is operated, the 2D foreground image in the 3D image, when viewed by a viewer of the apparatus, is in a front plane (e.g., a plane transverse to the Z axis/plane) and the 2D background image in the 3D image is in a back plane. The back plane is spaced apart from the front plane and more proximate to the 2D beam combining assembly such that depth is perceived by a viewer of the apparatus.

According to some embodiments, the 2D media source assembly includes first and second 2D media sources that each includes a planar imaging surface performing the first and second displaying, respectively. Then, the planar imaging surfaces of the first and second 2D media sources each has top and bottom ends associated with top and bottom portions of the 2D foreground image and 2D background image. Further, the first and second 2D media sources are orientated in the apparatus such that the planar imaging surfaces are angularly offset from each other with the bottom end of the planar imaging surface of the first 2D media source proximate to the top end of the planar imaging surface of the second 2D media source. The angular offset may be selected from the range of about 60 to about 120 degrees as measured between planes containing the planar imaging surfaces (e.g., about 90 degrees).

In some implementations of the apparatus, the 2D beam combining assembly includes a planar beam combining film with a range of transmissive incidence angles and a range of reflective incidence angles (e.g., a prismatic film such as a 3M™ Optical Lighting Film or the like). The planar imaging surface of the first 2D media source may be positioned at an angular offset from the beam combining film to provide light associated with the displayed 2D foreground image at an incidence angle within the range of transmissive incidence angles. Similarly, the planar imaging surface of the second 2D media source is positioned at an angular offset from the beam combining film to provide light associated with the displayed 2D foreground image at an incidence angle within the range of reflective incidence angles. For example, both may be tilted or rotated to an offset angle in the range of 30 to 60 degrees (such as 40 to 50 degrees or the like).

DETAILED DESCRIPTION OF THE PREFERRED EMBODIMENTS

Figure 1:
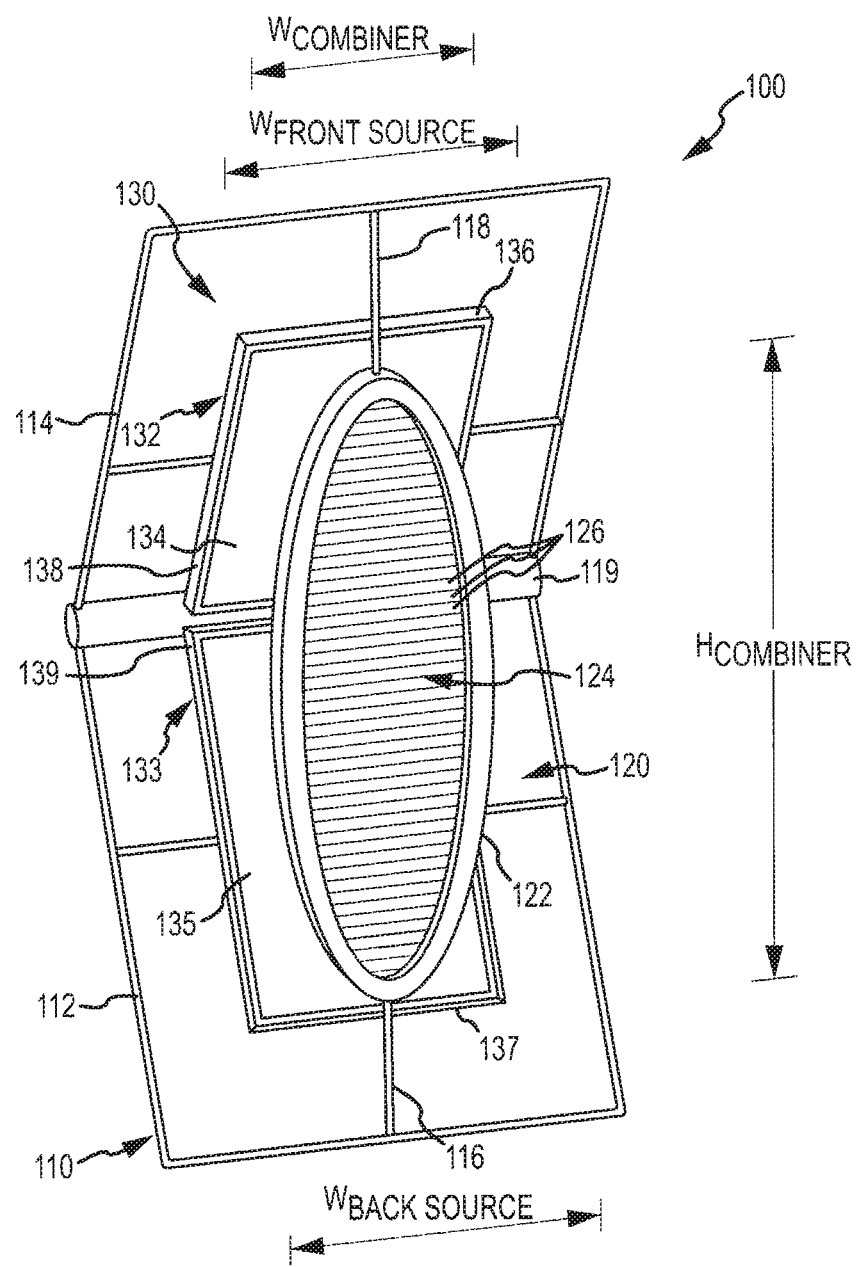
FIG. 1 illustrates an autostereoscopic or 3D display device of one embodiment, with the front and back image sources or displays in powered down or "off" states to show the components of the 3D display device.

Briefly, embodiments described herein are directed toward three dimensional (3D) display devices or systems that are autostereoscopic, as a viewer may perceive depth or the 3D effects in the displayed image without the use of 3D glasses or eyewear (e.g., no need for colored or switching lenses or the like). The 3D display devices described may be thought of as 2D media or beam combiners operating to create a 3D display by combining two 2D images into a single 3D image. The 3D image may readily be viewed in sunlight or other bright light environments as this light is diffused and not reflected directly back to a viewer and, of course, may also be very useful in dark environments as well (e.g., is not limited to sunlight and bright environments). The created 3D image may include static images or one or both of the 2D images may be a video or moving image, and the created 3D image may be thought of as an autostereoscopic, multiplane video image as each of the 2D images appears to the viewer to be in spaced apart planes that provide depth to the viewed imagery.

Briefly, a 3D display device is provided that includes a beam combining element and two or more imaging surfaces displaying or providing 2D images. The beam combining element includes a beam combining film (e.g., a planar sheet of optical lighting film or the like) that typically has a prismatic surface on one side and a planar or smooth surface on the other or opposite side. In the 3D display devices, the beam combining element is supported or arranged such that the prismatic surface faces outward (or is a front surface) toward a 3D display space or toward viewers (expected viewer locations). The planar surface faces inward toward the 2D imaging surface/2D image sources.

The beam combining film is formed of a material such as a plastic such that it is transmissive of light and, more significantly, is selected or configured such light that strikes its back/planar surface at particular incidence angles is transmitted through its body/substrate and out from the prismatic front surface (e.g., may be transmitted outward transverse such as orthogonal (or nearly orthogonal such as within 10 to 20 degrees of orthogonal) to the plane of the beam combining film). For example, the beam combining film may be thought of as having a range of transmissive incidence angles corresponding to a range of angles that light may strike the back surface of the film from a first direction and be transmitted through the film via the prismatic front surface. Further, the beam combining film may be thought of as having a range of reflective incidence angles corresponding to a range of angles that light may strike the back surface of the film from a second direction and be transmitted through the film via the prismatic front surface. These characteristics of the beam combining film are utilized by the 3D display device to combine 2D images to provide a single autostereoscopic, multiplane video image. The film may be stretched freely or laminated onto a rigid substrate such as a sheet of glass, polycarbonate, or the like.

Specifically, the 3D display device is configured to position a first imaging surface (e.g., an electronic display device or monitor screen) at a first angle relative to the back surface of the beam combining film such that its displayed images are transmitted through the film. For example, the first imaging surface may have an end mounted near the top edge of the beam combining film and be tilted away from the back surface to an angle such that light from the imaging surface strikes the back surface in its range of transmissive incidence angles (e.g., tilted away at an angle of about 40 to 45 degrees in some cases). The 3D display is further configured to position a second imaging surface at a second angle relative to the back surface of the beam combining film such that its displayed images are transmitted through the film with the images from the first imaging surface but at or in a different viewing plane (e.g., at an offset distance in the Z plane of the 3D display device). For example, the second imaging surface may have an end mounted near the bottom edge of the beam combining film and be tilted away from the back surface to an angle such that light from the imaging surface strikes the back surface in its range of reflective incidence angles (e.g., tilted away at an angle of about 40 to 45 degrees in some cases).

When both imaging surfaces are concurrently operated to display 2D video (or still) images, the beam combining film functions to combine the two 2D images from the angularly offset imaging surfaces (e.g., about a 90 degree offset if the tilting angles are both about 45 degrees) to create a 3D image. The 3D image includes the 2D video image from the first imaging surface in a front plane along the Z axis/plane (e.g., the 2D video image is a foreground image) and the 2D video image from the second imaging surface in a back plane spaced apart from the front plane along the Z axis/plane (e.g., the 2D video image is a background image). In other words, a viewer perceives both 2D video images concurrently with the images from the first imaging surface in front of the images from the second imaging surface relative to the beam combining film. Because of the optical nature of the prismatic surface of the beam combining film, sunlight and light from other sources scatters or is diffused when it strikes the front or viewing-side surface of the beam combining film instead of being reflected to the viewer's eyes. To a viewer observing the 3D display device in a brightly lit environment, the 3D imagery remains bright in full color and in high contrast and, yet, also looks as good in a dimly lit area/environment.

FIG. 1 illustrates a 3D display device 100 of one embodiment. The device 100 is shown in a non-operating state (e.g., prior to use to create a 3D image with 2D image sources). The device 100 includes a support frame or rigging assembly 110, which provides a lower support 112, an upper support 114, a middle support 119 connecting the lower and upper supports 112, 114, and combiner supports 116, 118. More significantly, the 3D display device 100 includes a 2D media combining (or beam combiner) assembly 120 and a 2D media source (or 2D imaging surfaces) assembly 130. The supports 116, 118 are used to rig or support the 2D media combining assembly 120 in the device 100 while the upper support 114 and the lower support 112 are used to support first and second 2D image sources (or display devices) 132, 133, respectively, with a particular angular orientation relative to a beam combining film in the 2D media combining assembly 120 and to each other (as explained in detail below).

The 2D media combining assembly 120 functions to combine light (or beams) striking it from two or more directions and at two or more incidence angles (or ranges of such incidence angles) on its back surface (e.g., a surface facing inward toward the supports 112, 114). The combined light is then transmitted outward from its front surface (e.g., a surface facing outward or away from the supports 112, 114). To this end, the 2D media combining assembly 120 includes a frame 122, and a beam combining film 124 is mounted into or on the frame 122. In this way, the frame 122 defines a window or portal through which a viewer may view images displayed by the first and second 2D image sources 132, 133. The beam combining film 124 has a front surface 126 facing outward (away from the sources 132, 133) that is configured both to diffuse light striking it and also to combine light from sources 132, 133 passing through from a back surface of film 124 into streams that it transmits outward in a generally orthogonal direction.

The 2D media combining assembly 100 is shown in FIG. 1 to include a 2D media source (or 2D imaging surfaces) assembly 130 that provides the first and second 2D image sources (or display devices) 132, 133. Each 2D image source 132, 133 includes a 2D imaging surface or display surface 134, 135, and the sources 132, 133 are rigged or arranged in the device 100 such as to face toward the beam combining film 124 such that images displayed upon the surfaces 134, 135 are visible to a viewer via the film 124.

More specifically, the frame assembly 110 is configured such that each of the main components of the device 100 are positioned on a side of a triangle to provide desired angular offsets (e.g., to cause light from sources 132, 133 to strike the back of film 124 at desired angles to be transmitted to a viewer as a combined image stream). For example, the supports 116, 118 may support the assembly 120 and film 124 in a first plane to provide a base or first side of a triangle. The upper support 114 may connect to the combiner support 118 (or directly to frame 122) to define a second side of the triangle by extending outward from the plane of the film 124 at a first angle, and the lower support 112 may connect to the combiner support 116 (or directly to frame 122) to define a third side of the triangle by extending outward from the plane of the film 124 at a second angle. The first and second angles are chosen such that light emitted from the imaging surfaces 134, 135 strikes the back of film 124 at incidence angles, such as transmissive incidence and reflective incidence angles, of the film 124 (which are determined or defined by the configuration of the prismatic front surface 126), that cause the emitted light or 2D images to be combined and transmitted through the film 124.

Figure 3:
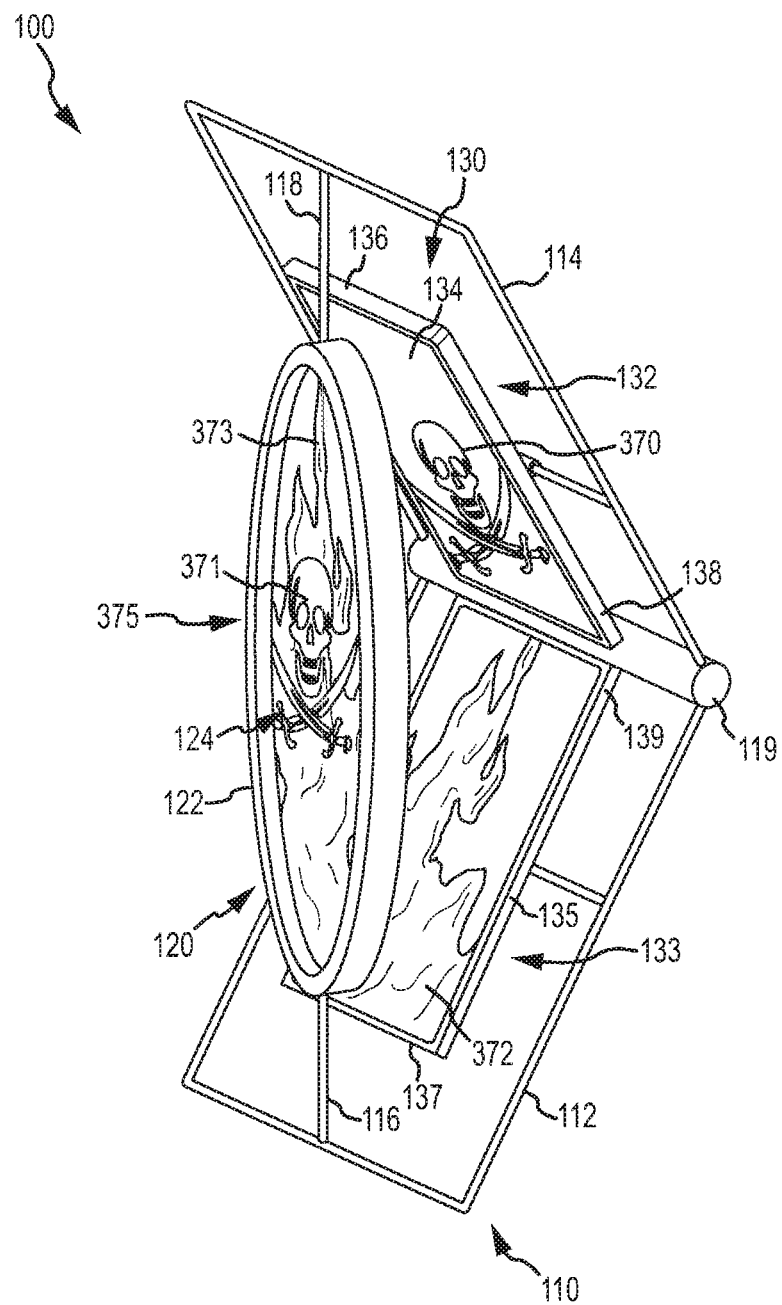
FIG. 3 illustrates another perspective view of the 3D display device shown in FIG. 1 with the front and back image sources or displays in powered up or "on" states showing use of the two displays in combination with a beam combining film to produce a single 3D image (e.g., an autostereoscopic multiplane video image or the like)

In the specific example of device 100, a first or top end 136 of first or front 2D image source 132 is positioned proximate to the top edge or end of the beam combining film 124. A second or bottom end 138 of the first or front 2D image source 132 is spaced apart from the film 124 and proximate to a first or top end 139 of the second or back 2D image source 133 (e.g., near mid or connector support 119). A second or bottom end 137 of the first or front 2D image source 133 is positioned proximate to the bottom edge or end of the beam combining film 124. The top and bottom ends of the film 124 may be reversed to practice the device 100. The "top" and "bottom" ends of the sources 132, 133 are generally used to refer to a top or bottom of the imaging or display surfaces 134, 135 (e.g., orientation of images shown or displayed on such surfaces 134, 135 similar to the top or bottom of a television screen or monitor display), and such distinctions are useful for properly combining two 2D images in a useful manner (e.g., with an upper part of a foreground image overlaid on the upper part of a background image or with both images "right side up" as shown in FIG. 3).

The shape and size of the window or portal defined by the frame 122 for viewing the film 124 and image sources 132, 133 may vary widely to practice the device 100. For example, the frame 122 may be oval with a height, $H_{Combiner}$, and width, $W_{combiner}$, of several inches up to several feet or more. The frame 122 may also be circular, triangular, square, rectangular, or nearly any other shape. The 2D image sources 132, 133 may have the same shape or a different shape (as shown) as the frame 122 and film 124. The shape of the imaging surfaces or display screens 134, 135 often will be rectangular such that off-the-shelf display devices such as LCDs, televisions, or the like may be used for sources 132, 133. The imaging surfaces 134, 135 typically will be at least the size of the frame 122 to fill the viewing area of the film 124 but this is not required (e.g., may display on only a portion of the film 124 or through only a subset of a window/portal defined by the frame 122, for example).

Figure 4:
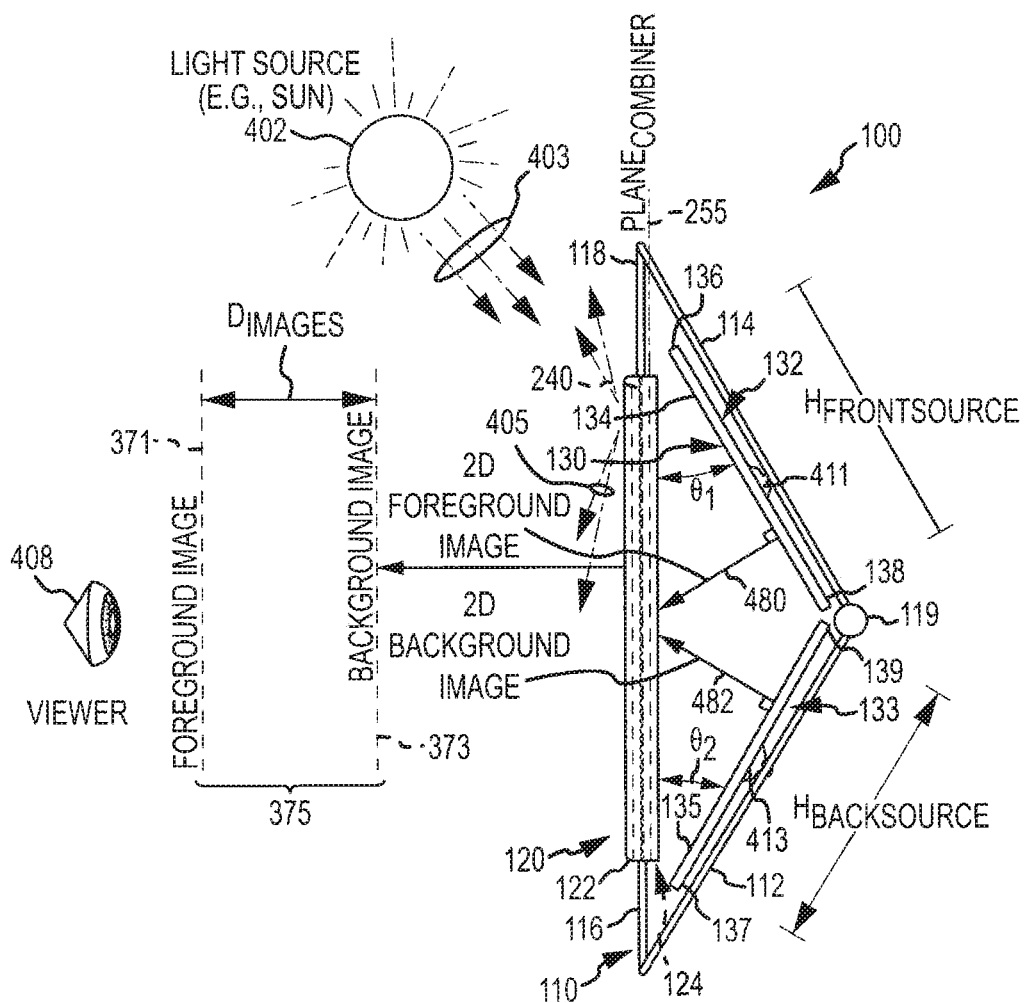
FIG. 4 is a sideview of the 3D display device of FIG. 3 showing schematically the combining of two 2D images (or 2D media streams) from the front and back image sources to provide the multiplane image visible to a viewer positioned near the 3D display device (e.g., looking through or at the window containing the beam combining film)

As shown, with reference to FIGS. 1 and 4, both the front source 132 and the back source 133 have heights, $H_{Front\ Source}$ and $H_{Back\ Source}$, and widths, $W_{Front\ Source}$ and $W_{Back\ Source}$, that are greater than the height, $H_{Combiner}$, and width, $W_{Combiner}$, of the framed film 124. These dimensions may be identical for the sources 132, 133 or may differ (as may the shape of the two sources 132, 133). For example, it may be useful to have a larger back source 133 to completely fill the film 124 in the window of the frame 122 with background imagery and a smaller front source (or sources) 132 to display foreground imagery in a plane in front of only portions of the background imagery.

Figure 2:
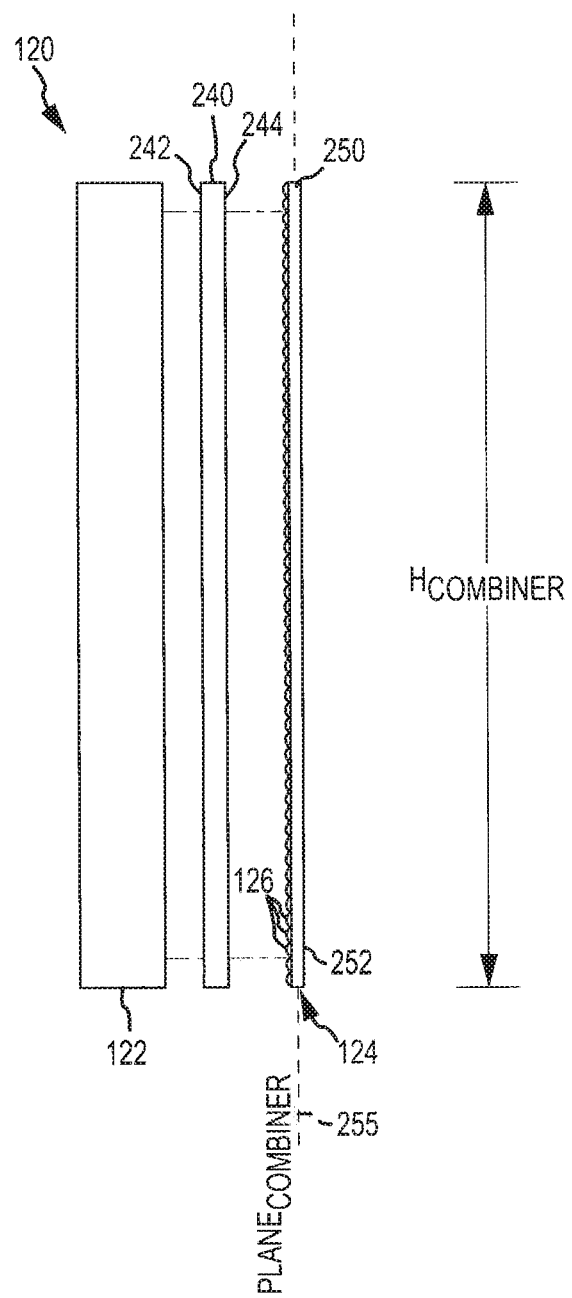
FIG. 2 illustrates an exploded view of the 2D beam combining assembly of the 3D display device of FIG. 1 showing lamination of a beam combining film/sheet to a planar piece of glass or similar translucent to transparent material.

FIG. 2 illustrates an exploded view of one implementation of the 2D media combiner assembly 120. As shown, the assembly 120 includes the frame 122 with an opening providing a window or view portal to the beam combining film 124. The beam combining film 124 may be laminated to or otherwise attached (such as with a transparent adhesive (not shown in FIG. 2)) to a sheet or pane 240 of glass or other translucent to transparent material (e.g., plexiglass, plastic, ceramic, or the like). The outer surface 242 of this sheet 240 may face outward from the assembly 120 while the back or inner surface 244 may abut or contact (or be spaced apart from) the prismatic front surface 126 of the beam combining film 124. In this manner, the sheet/pane 240 may be used to provide a protective coating for the surface 126 to allow cleaning of the display surfaces of assembly 120 (e.g., avoid damage of the surface 126 during cleaning or general use of assembly 120).

The beam combining film 124 also includes a body or substrate 250 that contains or supports the combining and light diffusing surface/portion 126 and also includes a planar or smooth back surface 252. The back surface 252 of the assembly 120 is positioned in the frame 122 to face or be exposed to the 2D image sources 132, 133 of the 3D display device 100. As discussed above, the beam combining film 124 typically is arranged in assembly 120 to be planar or flat in shape, with such an arrangement being shown with the plane, $Plane_{Combiner}$, labeled as 255 that extends into the page of FIG. 2 through the body or substrate 250 (or along surface 252).

A variety of materials may be used for the film 124 to achieve the desired combining of two beams or sets of images from differing/opposite directions at the same or differing angles of incidence. In one embodiment, the inventors used a prismatic film configured for use in a light tube/pipe or hollow straight light guide. For example, the beam combining film 124 may take the form of an optical light film such as, but not limited to, 3M™ Optical Lighting Film manufactured and distributed by 3M, St. Paul, Minn. or other similar products. Light tubes/pipes are used for transporting or distributing natural or artificial light, and, when used to distribute sunlight to inner spaces, they are sometimes called sun pipes or solar light pipes. Light tubes are formed of a clear tube that is lined with highly reflective materials; such as 3M™ Optical Lighting Film, that lead the light rays along the length of the light pipe or tube. In use in light tubes, the film is positioned with the prismatic surface facing inward to provide the desired reflectivity, and the light tube is not intended for imaging such that image distortions are not problematic.

In contrast, though, the beam combining film 124 is laid flat or in a planar orientation, and beams are passed through the planar or back surface 252 and body/substrate 250 (by directing these films to the film 124 at proper angles of incidence for transmission) to be combined in the prismatic portion 126 of the combiner 124. Hence, the inventors are utilizing the film 124 in a much different way than intended or taught by the manufacturer of the film 124 (e.g., as a beam combiner rather than a reflective, light guiding surface) to obtain a surprising effect. A further benefit is that the sunlight or other ambient light that strikes the front surface 126 is not reflected directly back into the eyes of a viewer but is instead diffused allowing the 3D image output from the film 124 to be readily viewed in good color and high contrast even in bright light settings (which was difficult with conventional 3D projection technologies).

FIG. 3 illustrates a perspective view of the 3D display device 100 during its use to provide (e.g., display, output, or the like) an autostereoscopic multiplane image 375 (which may be a video image or include one or more 2D video images). To this end, the first or front 2D image source 132 is operated (or powered on) to display a foreground or front plane 2D image (or first/front 2D media) 370 such as a color video of a character on its imaging surface 134. The second or back 2D image source 133 is concurrently operated (or powered on) to display a background or back plane 2D image (or second/back 2D media) 372 such as a color video of environmental, set, or other background images suited to the front image 370 (e.g., flames are shown in FIG. 3 as background images 372 while the foreground images 370 are a talking pirate skeleton).

As shown, the front 2D image source 132 is arranged to provide the front imaging surface 134 at an angular offset to the plane (Plane$_{Combiner}$) 255 of the beam combining sheet 124. Likewise, the back 2D image source 133 is arranged to provide the back imaging surface 135 at an angular offset to the plane 255 of the beam combining sheet 124. The top 136 of the front imaging surface 134 is placed proximate to the top of the film 124 while the bottom 137 of the back imaging surface 135 is placed proximate to the bottom of the film 124. In this arrangement, the beam combining film 124 functions to transmit the displayed front image 370 and back image 372 in a combined manner in autostereoscopic video image 375 as is shown with images 371, 373 in combined 3D imagery 375. The image 371 is in a front plane in the Z plane (or plane more distal to the front surface 126 of film 124 than a plane containing image 373) while image 373 is in a back plane in the Z plane that is spaced apart from the plane containing image 371 (in other words, image 371 is at a first depth and image 373 is at a second depth relative to a viewer). Since the image 371 is in "front" of the image 373, it covers or blocks viewing of a portion of the image 373 such that it typically will be desirable to select or design the 2D media 370 and 372 to achieve a desired combined image 375.

FIG. 4 illustrates the device 100 of FIG. 3 in a side view. As shown, the first 2D imaging or display surface 134 is angularly offset or tilted away from the plane 255 of the combining film 124. The angular offset, $\theta_1$, is chosen such that the emitted light 480 corresponding to the displayed images 370 strikes the back surface 252 of the film 124 at a transmissive incidence angle of the film 124 to be transmitted (orthogonally or the like) outward from the front surface 126 of the film 124. For example, the angular offset, $\theta_1$, may be 40 to 50 degrees (e.g., about 45 degrees or the like) when the transmissive incidence angle of the film 124 is known to be 45 degrees.

Similarly, the second 2D imaging or display surface 135 is angularly offset or tilted away from the plane 255 of the combining film 124. The angular offset, $\theta_2$, is chosen such that the emitted light 482 corresponding to the displayed 2D images (video or still) 372 strikes the back surface 252 of the film 124 at a reflective incidence angle of the film 124 so as to be transmitted (orthogonally or the like) outward from the front surface 126 of the film 124. The angular offset, $\theta_2$, may also be in the range of about 40 to 50 degrees (e.g., about 45 degrees or the like) such as when the reflective transmissive incidence angle of the film 125 is known to be 45 degrees.

As shown in FIG. 4, the beam combining film assembly 120 (with its beam combining film 124) functions to receive the 2D foreground image 480 and the 2D background image 482 from two differing directions/differing incidence angles and to combine these beams/image streams from imaging surfaces 134, 135. The result or output image stream is a single autostereoscopic video image 375 that is transmitted outward from the device 100 to a viewer 408 positioned in front of the frame 122 and film 124. The combined image 375 may be considered a 3D or multiplane image as foreground images 371 associated with received image stream 480 appear to be in a first or front plane of image 375 while background images 372 associated with received image stream 482 appear to the viewer 408 to be in a second or back plane of image 375.

As shown, the plane of the background images 373 is spaced apart a distance, $d_{Images}$, as measured along the Z axis/plane that provides depth to the image 375 when it is perceived or viewed by viewer 408 (when the corresponding light reaches eyes of a viewer). The depth, $d_{Images}$, is determined by a number of design parameters of the device 100 including the configuration of the beam combining film 124 (such as its incidence angle ranges (e.g, 30 to 45 degrees or the like as measured from an orthogonal plane passing into the plane of the film 124), the offset or tilt angles, $\theta_1$ and $\theta_2$, used to position the two 2D imaging surfaces 134, 135, and other parameters such as the separation of the surfaces 134, 135 from the back surface 252 of the film 124. In some cases, the depth, $d_{Images}$, achieved is 0.5 to 6 inches while in other cases the depth, $d_{Images}$, provided is 6 to 18 inches or more.

Figure 5:
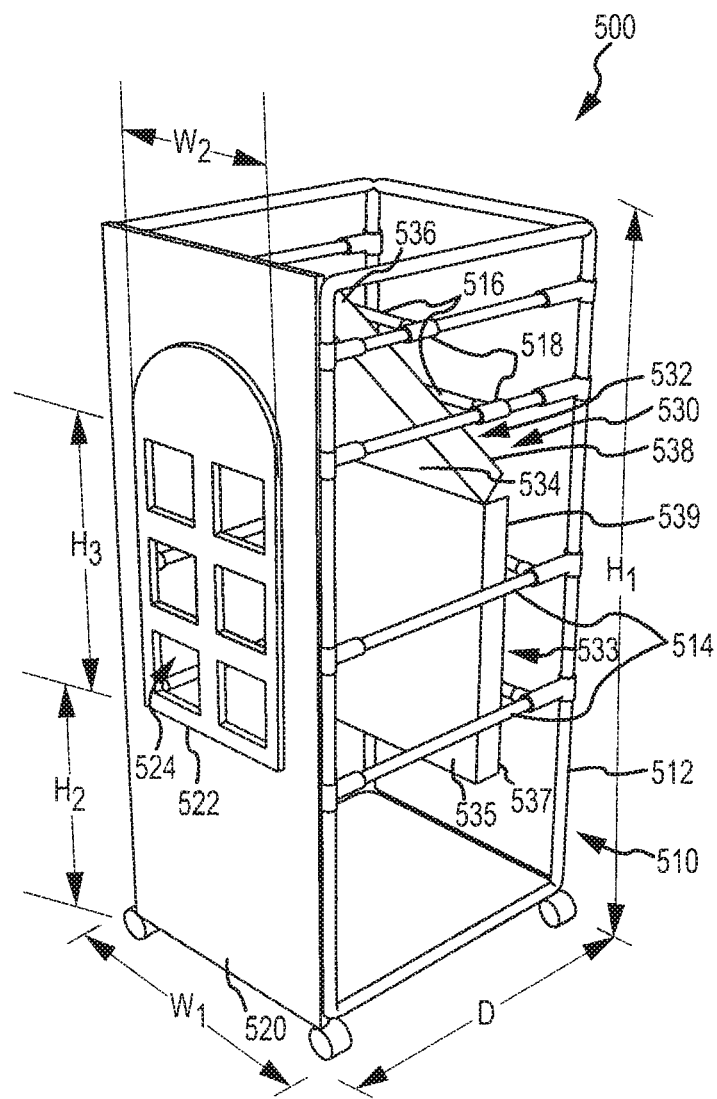
FIGS. 5-7 illustrate front perspective, rear perspective, and side views, respectively, of a 3D display device using the beam combining techniques described herein to produce an autostereoscopic image.
Figure 6:
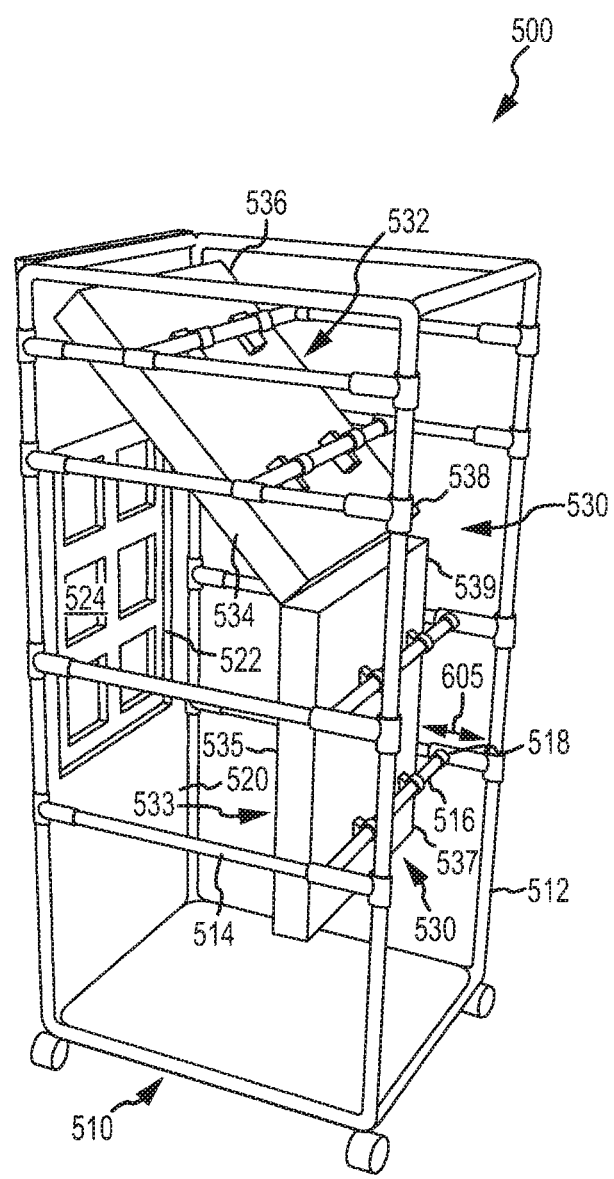
Figure 7:
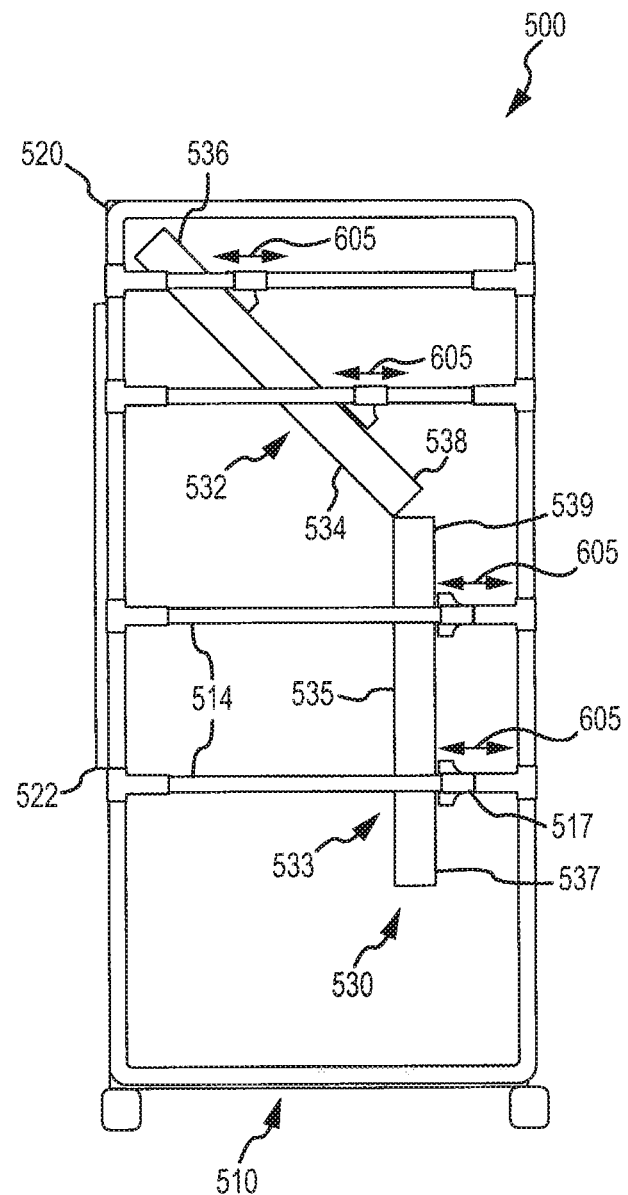

FIGS. 5-7 illustrate another useful embodiment of a 2D media combining device 500 for practicing the concepts presented in this description. The device 500 includes a rigging or frame structure 510 with vertical frame members or supports 512 (e.g., four or more) and horizontal frame members or supports 514 extending between the vertical supports 512, which together provide a structure for supporting the beam combining film 524 as well as the 2D media source assembly 530.

Specifically, the device 500 includes a front wall 520 that is mounted to a pair of front vertical supports 512. The wall 520 may generally be opaque to hide the source assembly 530 from view. The wall 520 may have a height, $H_1$, and width, $W_1$, that match or nearly match that of the frame structure 510. In one setting, the height, $H_1$, is in the range of 5 to 10 feet (e.g., 7 feet) while the width, $W_1$, is in the range of 2 to 5 feet (e.g., 3 feet). Within the front wall 520, a window or viewing portal 522 is provided that defines one or more openings exposing all or portions of a beam combining film 524, which is mounted to the inner surfaces of the window/portal 522 (with or without a protective covering layer as shown in FIG. 2).

Again, the film 524 may be arranged to be planar or substantially so on window 522, with its textured or prismatic front surface facing outward from the window 522 toward a likely location of a viewer external to the device 500 and with a top edge at the top or upper portion of the window 522 and a bottom edge at the bottom or lower portion of the window 522. The window 522 typically is positioned on wall 520 to be at a desired viewing height for expected visitors, which will vary with the age of the viewers, whether the viewers are seated/riding or walking, and other factors. In one implementation, the bottom of the window 522 is at a height, $H_2$, in the range of 2 to 4 feet (e.g., about 32 inches) while the top of the window is at a height, $H_3$, in the range of 3 to 8 feet (e.g., about 50 inches).

The 2D media source assembly 530 is shown to include a first or front plane 2D image source 532 and a second or back plane 2D image source 533. The sources 532, 533 are hung or rigged to the structure 510 using mounting supports 516 extending between the horizontal supports 514. Slidable/positionable T-connectors 518 are provided at the ends of the mounting supports 516 to allow the offset or tilt angle of each imaging surface 534, 535 to be set/changed 605 relative to the back surface of the film 524. For example, the relative position of the first source 532 has been set with an offset angle of about 40 to 50 degrees while the second source 533 has either been set with a differing offset angle or has not yet been positioned relative to the beam combining film 524 (e.g., not yet had been slid via connectors 518 to have an offset angle of about 40 to 50 degrees (the same or differing from the offset angle of the first source's imaging surface 534)).

The first source 532 includes a top/first edge or end 536 that is positioned proximate or adjacent to an inner surface of the front wall 520. Note, in this embodiment of device 500, the top edge 536 is not adjacent to the top of the beam combining film 525 but is, instead, above the top of the film 525 a preset distance (which may be useful if viewers are looking upward into the window 522 from below or to achieve other effects or when the imaging surface 534 is significantly larger than the window 522), such as several inches up to about 2 feet above the top of the film 524. The bottom/second edge or end 538 of the first source is spaced apart from the back surface of the film 524 as an angular offset or tilt angle (40 to 45 degrees or the like) is defined between the imaging surface 534 of the source 532 and the plane extending through the film 524 (or its back surface). For example, depending on the offset angle and the size of the surface 534 the offset distance for end 538 may be several inches up to several feet (such as 2 to 5 feet or the like if a larger LCD or the like is used as source 532).

The first or top end/edge 539 of the second or back plane 2D source 533 is pivotally mounted to the second or bottom end/edge 538 of the first source 532 (such as via a connector like 119 shown in FIG. 1). In this way, an angular offset is established between the imaging surfaces 534, 535 (such as 90 degrees when the tilting angles of the surfaces 534, 535 relative to film 524 are 45 degrees and so on as defined by a triangle including the surfaces 534, 535 and film 525 (or planes containing such surfaces/film)). The imaging surface 535 of the second source 533 is positioned relative to the film 524 by sliding 605 the connectors 517 and mounting support 516 inward or outward toward the film 524 (or its back surface). Typically, as discussed above, the second or bottom edge/end 537 of the source 533 is positioned adjacent and proximate (or even contacting) the inner surface of the wall 520. As with the first source 532, this results in the bottom edge 537 of the source 533 (and imaging surface 535) being a distance below the bottom of the film 524 (such as several inches up to several feet below). The offset angle defined between the plane of the film 524 and the plane of the imaging surface 535 is chosen such that light from the surface 535 strikes the back surface of beam combining film 524 at an incidence angle (e.g., reflective incidence angle) of the film 524 to cause the light (and 2D image) to be transmitted through the film 524 (with 2D image from imaging surface 534) to be visible as a 3D display through openings in window 522. Again, the offset or tilting angle may be the same as that used for the surface 534 or differ with some implementations using an offset angle of about 40 to 50 degrees (e.g., when the film 524 comprises an optical lighting film such as, but not limited to, 3M™ Optical Lighting Film, with incidence angles of about 40 to 45 degrees).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. For example, the examples of 2D media combiners showed the use of two 2D imaging surfaces, but the concepts described herein readily are expanded to use of three, four, or more such 2D surfaces. For example, the back plane 2D source may be a single large LCD or other monitors/display devices to provide a large surface area background image while two, three, or more smaller LCDs or other monitors/display devices may be used to provide a front plane 2D source with multiple imaging surfaces (that are at the same or differing offset angles relative to the plane of the combining film).

In some embodiments, the second monitor may be replaced by a physical set piece. In other words, the beam combiner concept is readily expanded to be able to overlay digital images over a physical set just as it was described as being able to overlay a digital image over a digital image.

We claim:

1. An apparatus for creating an autostereoscopic display, comprising:
   a two dimensional (2D) beam combining assembly comprising a planar beam combining with a first surface and a second surface opposite the first surface; and
   a 2D media source assembly first displaying a 2D foreground image toward the first surface of the 2D beam combining assembly and second displaying a 2D background image, differing from the 2D foreground image, toward the first surface of the 2D beam combining assembly, wherein light from the 2D media source assembly associated with the 2D foreground image and with the 2D background image strike the first surface of the 2D beam combining assembly prior to passing through the second surface and wherein the 2D beam combining assembly concurrently transmits from the second surface the 2D foreground image and the 2D background image in a combined three dimensional (3D) image.

2. The apparatus of claim 1, wherein, when viewed by a viewer, the 2D foreground image in the 3D image is in a front plane and the 2D background image in the 3D image is in a back plane, the back plane being spaced apart from the front plane and more proximate to the 2D beam combining assembly.

3. The apparatus of claim 1, wherein the 2D media source assembly comprises first and second 2D media sources each including a planar imaging surface performing the first and second displaying, respectively.

4. The apparatus of claim 3, wherein the planar imaging surfaces of the first and second 2D media sources each has top and bottom ends associated with top and bottom portions of the 2D foreground image and 2D background image and wherein the first and second 2D media sources are orientated in the apparatus such that the planar imaging surfaces are angularly offset from each other with the bottom end of the planar imaging surface of the first 2D media source proximate to the top end of the planar imaging surface of the second 2D media source.

5. The apparatus of claim 4, wherein the angular offset is selected from the range of about 60 to about 120 degrees as measured between planes containing the planar imaging surfaces.

6. The apparatus of claim 3, wherein the planar beam combining film has a range of transmissive incidence angles and a range of reflective incidence angles, wherein the planar imaging surface of the first 2D media source is positioned at an angular offset from the beam combining film to provide light associated with the displayed 2D foreground image onto the first surface at an incidence angle within the range of transmissive incidence angles, and wherein the planar imaging surface of the second 2D media source is positioned at an angular offset from the beam combining film to provide light associated with the displayed 2D foreground image onto the first surface at an incidence angle within the range of reflective incidence angles.

7. The apparatus of claim 3, wherein the planar imaging surface of the first 2D media source is positioned with a top edge proximate to a plane passing through the beam combining film with the planar imaging surface at an offset angle of at least about 30 degrees relative to the first surface, and wherein the planar imaging surface of the second 2D media source is positioned with a bottom edge proximate to the plane passing through the beam combining film with the planar imaging surface at an offset angle of at least about 30 degrees relative to the first surface.

8. An apparatus for creating an autostereoscopic display, comprising:
a two dimensional (2D) beam combining assembly comprising a beam combining film with a first surface and a second surface opposite the first surface; and
a 2D media source assembly first displaying a 2D foreground image toward the first surface of the beam combining film of the 2D beam combining assembly and second displaying a 2D background image toward the first surface of the beam combining film of the 2D beam combining assembly,
wherein, after the 2D foreground image and the 2D background image are first received on the first surface, the 2D beam combining assembly concurrently transmits the 2D foreground image and the 2D background image from the second surface in a combined three dimensional (3D) image and
wherein the 2D media source assembly comprises first and second 2D media sources each including a planar imaging surface performing the first and second displaying, respectively.

9. The apparatus of claim 8, wherein the planar imaging surfaces of the first and second 2D media sources each has top and bottom ends associated with top and bottom portions of the 2D foreground image and 2D background image and wherein the first and second 2D media sources are orientated in the apparatus such that the planar imaging surfaces are angularly offset from each other with the bottom end of the planar imaging surface of the first 2D media source proximate to the top end of the planar imaging surface of the second 2D media source.

10. The apparatus of claim 9, wherein the angular offset is selected from the range of about 60 to about 120 degrees as measured between planes containing the planar imaging surfaces.

11. The apparatus of claim 8, wherein the beam combining film has a range of transmissive incidence angles and a range of reflective incidence angles, wherein the planar imaging surface of the first 2D media source is positioned at an angular offset from the first surface of the beam combining film to provide light associated with the displayed 2D foreground image at an incidence angle within the range of transmissive incidence angles, and wherein the planar imaging surface of the second 2D media source is positioned at an angular offset from the first surface of the beam combining film to provide light associated with the displayed 2D foreground image at an incidence angle within the range of reflective incidence angles.

12. The apparatus of claim 8, wherein the planar imaging surface of the first 2D media source is positioned with a top edge proximate to a plane passing through the beam combining film with the planar imaging surface at an offset angle of at least about 30 degrees relative to the first surface, and wherein the planar imaging surface of the second 2D media source is positioned with a bottom edge proximate to the plane passing through the beam combining film with the planar imaging surface at an offset angle of at least about 30 degrees relative to the first surface.

13. An apparatus for creating an autostereoscopic display, comprising:
a two dimensional (2D) beam combining assembly comprising a beam combining film with a planar first surface and a prismatic second surface opposite the planar first surface; and
a 2D media source assembly first displaying a 2D foreground image onto the planar first surface of the 2D beam combining assembly and second displaying a 2D background image onto the planar first surface of the 2D beam combining assembly whereby the 2D foreground image and the 2D background image first strike the first surface prior to second striking the second surface of the two 2D beam combining assembly,
wherein the 2D beam combining assembly concurrently transmits the 2D foreground image and the 2D background image in a combined three dimensional (3D) image from the prismatic second surface,
wherein the 2D beam combining assembly comprises a planar beam combining film with a range of transmissive incidence angles and a range of reflective incidence angles, and
wherein the planar imaging surface of the first 2D media source is positioned at an angular offset from the planar first surface of the beam combining film to provide light associated with the displayed 2D foreground image at an incidence angle within the range of transmissive incidence angles and wherein the planar imaging surface of the second 2D media source is positioned at an angular offset from the planar first surface of the beam combining film to provide light associated with the displayed 2D foreground image at an incidence angle within the range of reflective incidence angles.

14. The apparatus of claim 13, wherein, when viewed by a viewer, the 2D foreground image in the 3D image is in a front plane and the 2D background image in the 3D image is in a back plane, the back plane being spaced apart from the front plane and more proximate to the 2D beam combining assembly.

15. The apparatus of claim 13, wherein the 2D media source assembly comprises first and second 2D media sources each including a planar imaging surface performing the first and second displaying, respectively.

16. The apparatus of claim 15, wherein the planar imaging surfaces of the first and second 2D media sources each has top and bottom ends associated with top and bottom portions of the 2D foreground image and 2D background image and wherein the first and second 2D media sources are orientated in the apparatus such that the planar imaging surfaces are angularly offset from each other with the bottom end of the planar imaging surface of the first 2D media source proximate to the top end of the planar imaging surface of the second 2D media source.

17. The apparatus of claim 16, wherein the angular offset is selected from the range of about 60 to about 120 degrees as measured between planes containing the planar imaging surfaces.

18. The apparatus of claim 13, wherein the planar imaging surface of the first 2D media source is positioned with a top edge proximate to a plane passing through the beam combining film with the planar imaging surface at an offset angle of at least about 30 degrees and wherein the planar imaging surface of the second 2D media source is positioned with a bottom edge proximate to the plane passing through the beam combining film with the planar imaging surface at an offset angle of at least about 30 degrees.

* * * * *

UNITED STATES PATENT AND TRADEMARK OFFICE
CERTIFICATE OF CORRECTION

PATENT NO. : 8,836,755 B2
APPLICATION NO. : 12/897369
DATED : September 16, 2014
INVENTOR(S) : Daniel M. Joseph et al.

It is certified that error appears in the above-identified patent and that said Letters Patent is hereby corrected as shown below:

In the Claims

Please replace Column 12, lines 33-51, with the following:

1. An apparatus for creating an autostereoscopic display, comprising:
   a two dimensional (2D) beam combining assembly comprising a planar beam combining film with a first surface and a second surface opposite the first surface; and
   a 2D media source assembly first displaying a 2D foreground image toward the first surface of the 2D beam combining assembly and second displaying a 2D background image, differing from the 2D foreground image, toward the first surface of the 2D beam combining assembly, wherein light from the 2D media source assembly associated with the 2D foreground image and with the 2D background image strike the first surface of the 2D beam combining assembly prior to passing through the second surface and wherein the 2D beam combining assembly concurrently transmits from the second surface the 2D foreground image and the 2D background image in a combined three dimensional (3D) image.

Signed and Sealed this
Tenth Day of February, 2015

Michelle K. Lee
*Deputy Director of the United States Patent and Trademark Office*